United States Patent [19]

Andou et al.

[11] Patent Number: 4,962,876

[45] Date of Patent: Oct. 16, 1990

[54] METHOD OF PRODUCING A MOVABLE PART OF A WIRE-DOT PRINT HEAD

[75] Inventors: Hirokazu Andou; Tatsuhiko Shimomura; Hiroshi Kikuchi, all of Tokyo, Japan

[73] Assignee: Oki Electric Industry Co., Ltd., Tokyo, Japan

[21] Appl. No.: 318,312

[22] Filed: Mar. 3, 1989

[30] Foreign Application Priority Data

Mar. 14, 1988 [JP] Japan .................................. 63-59609

[51] Int. Cl.[5] ..................... B23K 31/00; B23K 101/36; B23K 20/00

[52] U.S. Cl. .................................... 228/193; 228/170; 400/124

[58] Field of Search ............... 228/170, 193, 239, 194, 228/195, 182; 400/124

[56] References Cited

U.S. PATENT DOCUMENTS

| | | | |
|---|---|---|---|
| 4,555,192 | 11/1985 | Ochiai | 400/124 |
| 4,610,553 | 9/1986 | Yasunaga et al. | 400/124 |
| 4,618,277 | 10/1986 | Asano et al. | 400/124 |
| 4,652,158 | 3/1987 | Asano et al. | 400/124 |
| 4,798,488 | 1/1989 | Uozumi | 400/124 |
| 4,883,219 | 11/1989 | Anderson et al. | 228/190 |
| 4,886,382 | 12/1989 | Oota et al. | 400/124 |

FOREIGN PATENT DOCUMENTS 109701 1/1985 Japan .

*Primary Examiner*—Sam Heinrich
*Attorney, Agent, or Firm*—Panitch Schwarze Jacobs & Nadel

[57] ABSTRACT

In a method of producing a movable part of a wire-dot print head comprising an armature supported by a plate spring, and a lever having a tip to which print wire is fixed, the armature and the lever are formed of alloys containing identical atoms or alloys easy to diffuse into each other, a bond part of a base part of the lever is inserted in a bond groove in a tip of the armature, and the lever and the armature are heat-treated in vacuum at a temperature not lower than 1100° C. and below the melting points of the lever and the armature, so that the lever and the armature are diffusion-bonded.

9 Claims, 4 Drawing Sheets

METHOD OF PRODUCING A MOVABLE PART OF A WIRE-DOT PRINT HEAD

BACKGROUND OF THE INVENTION

The present invention relates to a movable part of a wire-dot print head used in an impact printer, and more particularly to a method of producing a movable part comprising a lever to which a print wire is fixed and an armature supported by a plate spring.

As is well known, impact printers have an advantage of being low priced, and is capable of printing on a variety of media, so they are utilized in output devices of data processing systems and various other applications. With the widespread application, their performance is also improved, but still in recent years, even higher printing speed and even higher reliability of printing are demanded.

To answer these demands, in wire-dot print heads of the spring-charge type used in impact printers, it is desired to improve the strength of the movable part comprising the lever to which the print wire is fixed and the armature supported by the plate spring thereby to avoid breakage of the movable part due to fatigue and to ensure a long-time stable operation.

A wire-dot print head of the spring-charge type will be taken as an example for further explanation with reference to FIG. 2.

FIG. 2 is a side view of a wire-dot print head. To clarify the internal structure, the lower half is shown in section.

In the figure, reference numeral 1 denotes a print wire. Reference numeral 2 denotes a lever to which a base part of the print wire 1 is fixed. Reference numeral 3 denotes an armature to a tip part of which a base part of the lever 2 is fixed. A base part of the armature 3 is supported to a tip of a biasing plate spring 4. A base part of the plate spring 4 is fixed to an armature support 5.

Reference numeral 6 denotes a first yoke. Reference numeral 7 denotes a first annular magnetic spacer. Reference numeral 8 denotes a second annular magnetic spacer. Reference numeral 9 denotes an annular permanent magnet. Reference numeral 10 denotes a base on the central part of which a plurality of cores 11 are arranged to form substantially a circle or an ellipse. On the periphery of the base 10, the first yoke 6, the magnetic spacer 7, the second yoke 8, and the permanent magnet 9 are stacked in a predefined order. On the inner side of the first yoke 6, which is disposed at the frontmost position, the armature support 5 is fixed so that the armature 3 extends to confront the core 11.

The movable parts each comprising the print wire 1, the lever 2, the armature 3 and the plate spring 4 are provided in the same number as the cores 11.

Reference numeral 12 denotes a demagnetizing coil fitted on each core 11. Reference numeral 13 denotes a cover mounted on the outside of the first yoke 6. To a tip of the cover 13 formed to protrude at the center of the cover 13, the tips of the print wires 1 are guided and regulated to be in a predefined arrangement.

Reference numeral 14 denotes an ink ribbon. Reference numeral 15 denotes printing media such as printing paper. Reference numeral 16 denotes a platen disposed to confront the guide part of the cover 13, through the ink ribbon 14 and the printing media.

The operation of one movable part of the wire-dot print head of the above structure will be briefly described.

When the demagnetizing coil 12 is not energized, the magnetic flux of the permanent magnet 9 flows through a magnetic circuit comprised of the second yoke 8, the magnetic spacer 7, the first yoke 6, the armature 3, the core 11 and the base 10. As a result, because of the magnetic attracting force generated between the armature 3 and the core 11, the armature 3 is attracted to the core 11, bending the plate spring 4.

At that time, because of the attracting operation, the print wire 1 is displaced, together with the lever 2, toward the base 10, and this displaced position is the initial position for the print wire and the lever 2.

In this state, if the demagnetizing coil 12 is energized, the magnetic flux of the permanent magnet 9 is canceled, and the armature 3 is released from the attracting force of the core 11, and the plate spring 4 restores its shape and the armature 3 is separated from the core 11.

Because of the separating operation of the armature 3, the lever and the print wire 1 are driven and the tip of the print wire 1 projects out of the tip of the guide part of the cover 13, and the projecting tip impacts, through the ink ribbon 14 and the printing media 15, the platen 16, so that ink on the ink ribbon 14 is transferred, as a dot, onto the printing media 15.

After that, because of the repulsion to the impact, the print wire 1 begins returning in the direction opposite to the direction in which it projected, and at the same time, the current to the demagnetizing coil 12 is interrupted. As a result, the magnetic flux of the permanent magnet 9 flows through the above-mentioned magnetic path, and accordingly the armature 3 is again attracted to the core 11. Consequently, the print wire 1 and the lever 2 return to the initial position.

The above is an operation during one cycle of printing operation. In actual printing, each movable part is selectively driven responsive to the print data, and characters or the like formed of dots are printed.

The conventional movable part in the above described wire-dot print head has the following structure. As the lever 2, maraging (martensite aging) steel, Elgiloy (tradename), or the like generally known as a high-strength spring material is used, and as the material of the armature, silicon steel, Permendur or any other high-magnetic flux density material is used, so as to reduce the weight, and the base part of the lever 2 and the tip of the armature 3 are bonded. The method of the bonding normally employed is brazing. Generally, the brazing filler materials have a melting point lower than the materials to be bonded to each other. Elements of the same kind, i.e., elements containing the same atoms, as the materials to be bonded, or elements having affinity with the materials to be bonded are mixed in the brazing filler materials, so that sufficient bond strength can be obtained.

For bonding the base part of the lever 2 and the armature 3, silver brazing is employed. Where a high strength is required, the lever materials and the armature materials are properly selected and the copper brazing is conducted in a non-oxidizing atmosphere.

In the above-described prior art, at the time of impact of the print wire on the platen during printing operation, and at the time of re-attraction by the core of the armature, the movable part comprising the print wire, the lever, and the armature receive impact, breakage and separation of the bonded part between the lever and the armature can occur.

One reason for this is considered to be that as flux is used in the silver brazing, oxidation near the bonded part due to the flux can deteriorate the lever material strength. Moreover, where copper brazing is used for the bonding, the bonded part is easy to be oxidized in wet atmosphere, or in atmosphere containing chlorine, or sulfur, and is easy to corrode, and hence the strength is degraded. This is an obstacle to obtaining a high reliability of a printing head.

SUMMARY OF THE INVENTION

An object of the invention is to eliminate the above problems.

Another object of the invention is to provide a method of fabricating the movable part of the wire-dot print head which is free from the problem of breakage and separation of the bonded part between the lever and the armature and which is highly reliable.

To achieve the above object, the present invention is featured by using, as the materials of the lever and the armature, metals or alloys easy to diffuse into each other, such as metals or alloys containing identical atoms, inserting the bond part of the base part of the lever in a bond groove provided in the tip of the armature, and heat-treating the lever and the armature in vacuum at a temperature above 1100° C. and below the melting temperatures of the lever and the armature so that they are diffusion-bonded.

According to the invention, the base part of the lever is inserted or fitted in the armature, and they are diffusion-bonded. Accordingly, it is possible to avoid the degradation of the lever material due to oxidation of the flux.

As a result, breakage and separation of the lever and the armature can be prevented, and a highly reliable wire-dot print head having a sufficient bond strength can be obtained.

DETAILED DESCRIPTION OF THE EMBODIMENTS

An embodiment of the invention will now be described with reference to the drawings.

Figure 1:
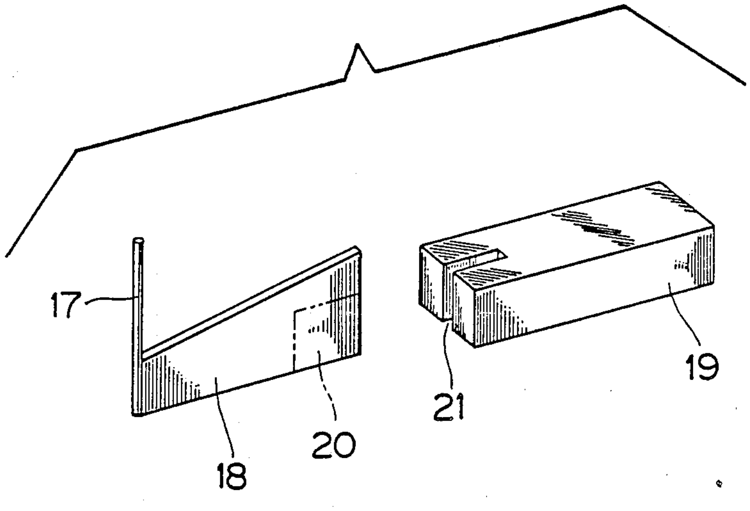
FIG. 1 is an exploded oblique view showing an example of a movable part of a wire-dot print head fabricated by the present invention.

FIG. 1 is an exploded, oblique view showing an example of a wire-dot print head fabricated by the present invention. In the figure, reference numeral 17 denotes a print wire. Reference numeral 18 denotes a lever to the tip of which the base part of the print wire 17 is fixed. Reference numeral 19 denotes an armature. In this embodiment, the lever 18 and the armature 19 are formed of materials containing identical atoms or materials easy to diffuse, and the base part of the lever is made to form a bond part 20, and the tip of the armature is provided with a bond groove or cut-away 21 to correspond to the shape of the bond part 20. In the embodiment illustrated, the bond part 20 of the lever is plate-shaped and the bond groove 21 is in the form of a slit having a width corresponding to the thickness of the bond part 20.

The bond part 20 is inserted or fitted in the bond groove 21 and they are bonded by heat-diffusion.

Now the method of fabrication of the movable part of the above structure will be described.

Generally, in diffusion-bonding or diffusion-joining, it is effective to use materials easy to diffuse into each other, such as materials containing identical atoms. Combinations of materials having diffusion coefficients of not less than about $1\times10^{-14}$ m$^2$/sec. at the temperature of the heat treatment for the purpose of diffusion have been found satisfy the requirements. What follows are examples having been satisfactory.

First, in a combination in which iron is contained as the identical atoms, SK steel (carbon tool steel) is used as the material for the lever 18, and 1 to 5% silicon steel is used as the material for the armature 19. An example of the SK steel that is suitable for the purpose contain 0.8 to 0.9% of carbon (C), not more than 0.35% of silicon (Si), not more than 0.5% of maganese (Mn), not more than 0.08% of phosphorus (P), not more than 0.03% of sulfur (S) and the remainder of iron (Fe). An example of the suitable silicon steel contains 0.015% of carbon (C), 0.95 to 1.25% of silicon (Si), 0.3% of maganese (Mn), 0.008% of phosphorus (P), 0.012% of sulfur (S), 0.03% of copper (Cu), and the remainder of iron (Fe).

In a combination in which cobalt is contained as the identical atoms, maraging steel, titanium alloy or Elgiloy or the like is used as the material for the lever 18, and high-density magnetic flux material containing cobalt, such as Permendur or the like is used as the material for the armature 19. An example of suitable maraging steel contains not more than 0.03% of carbon (C), not more than 0.1% of silicon (Si), not more than 0.1% of manganese (Mn), 18.00 to 19.00% of nickel (Ni), 8.5 to 9.5% of cobalt (Co), 4.6 to 5.2 molybdenum (Mo), 0.5 to 0.7% of titanium (Ti), 0.05 to 0.15% of aluminum (Al), not more than 0.1% of phosphorus (P) and sulfur (S), and the remainder of iron (Fe). An example of suitable titanium alloy contains 5.5 to 6.75% of aluminum (Al), 3.5 to 4.5% of vanadium (V), not more than 0.3% of iron (Fe), not more than 0.2% of oxygen (O), not more than 0.1% of carbon (C), not more than 0.05% of nitrogen (N), not more than 0.015% of hydrogen (H), not more than 0.005% of yttrium (Y), and the remainder of titanium (Ti). An example of suitable Elgiloy contains 0.1 to 0.2% of carbon (C), not more than 1% of silicon (Si), not more than 2% of manganese (Mn), not more than 0.03% of phosphorus (P), not more than 0.03% of sulfur (S), 12.00 to 14.00% of nickel (Ni), 19.00 to 21.00% of chromium (Cr), 1.6 to 2.4% of molybdenum (Mo), 40.00 to 46.00% of cobalt (Co), not more than 0.1% of beryllium (Be), 2.4 to 3.2% of tungsten (W), and the remainder of iron (Fe). An example of suitable Permendur contains 50% of cobalt (Co), 2% of vanadium (V), and the remainder of iron (Fe).

The surface of the bond part 20 of the lever 18 and the inner surface of the bond groove 21 of the armature 19 formed of the materials described above are polished to be as smooth as possible, and the bond part 20 of the lever 18 is then pushed into the bond groove 21 of the armature 19 to be into engagement.

It is so designed that the pressure which the bond part 20 receives from the bond groove 21 is in the order of 0.3 to 0.5 kgf/cm$^2$.

The lever 18 and the armature 19 having the bond part 20 and the bond groove 21 being in engagement are then placed in a vacuum reactor (up to $1\times10^{-4}$ Torr.), and heat-treated at a temperature of 1100° C. or higher for about 5 hours, so that the lever 18 and the armature 19 are diffusion-bonded at the bond part 20 and the bond groove 21. The temperature should not be higher than the melting points of the materials of the lever 18 and the armature 19.

Now experimental fabrication of the movable part and results of the endurance tests will be described.

Movable parts were fabricated by silver brazing and heat diffusion using the following combinations of the materials: (1) lever 18: SK steel; armature 19: 1% silicon steel. (2) lever 18: maraging steel armature 19: Permendur.

Figure 2:
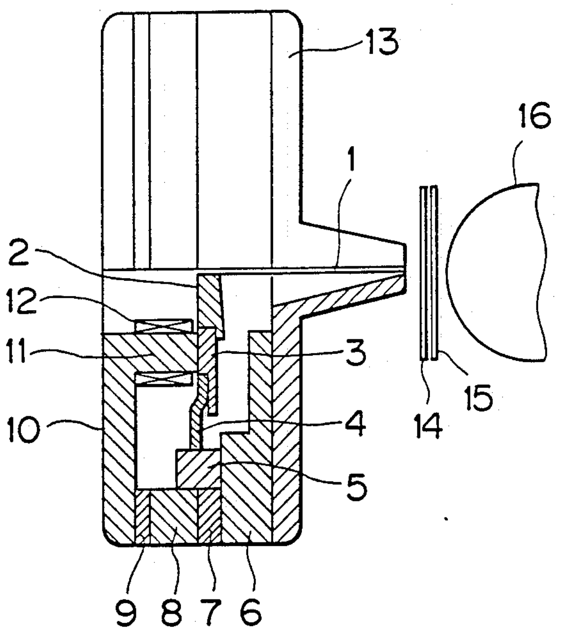
FIG. 2 is a side view of a wire-dot print head.

The movable parts are then built in a wire-dot print head shown in FIG. 2, and printing operation was continued in an impact printer, with the platen gap between the print wire 17 and the platen 16 set at 0.35 mm.

Figure 3:
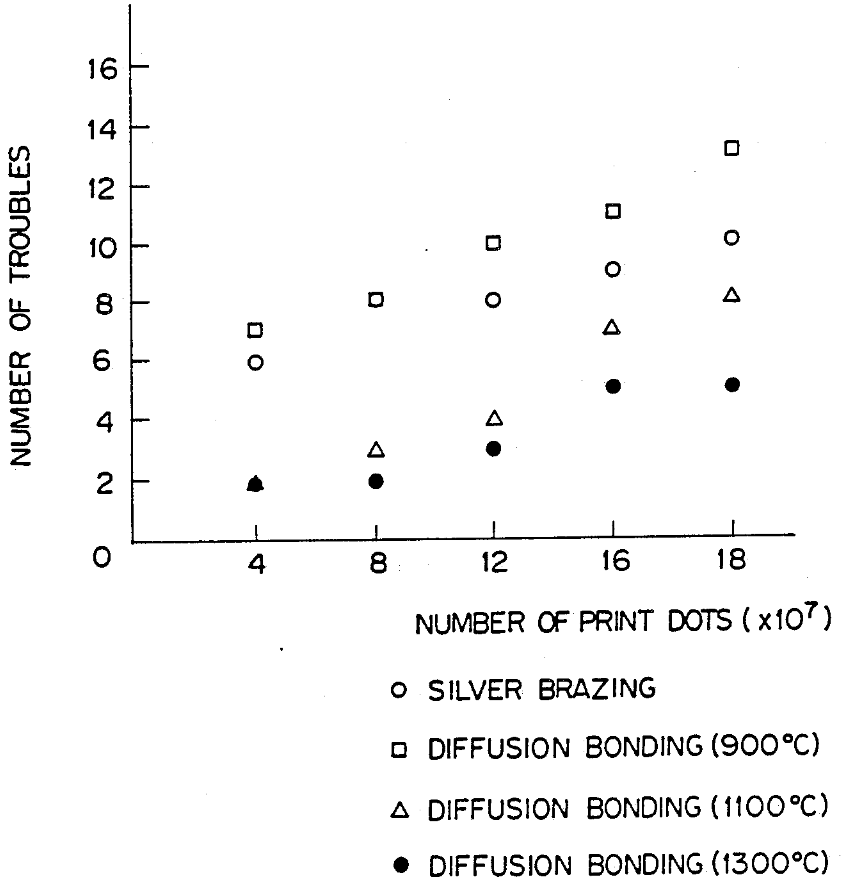
FIG. 3 is a diagram showing the strength of the bonded part obtained as a result of experiments.
Figure 4:
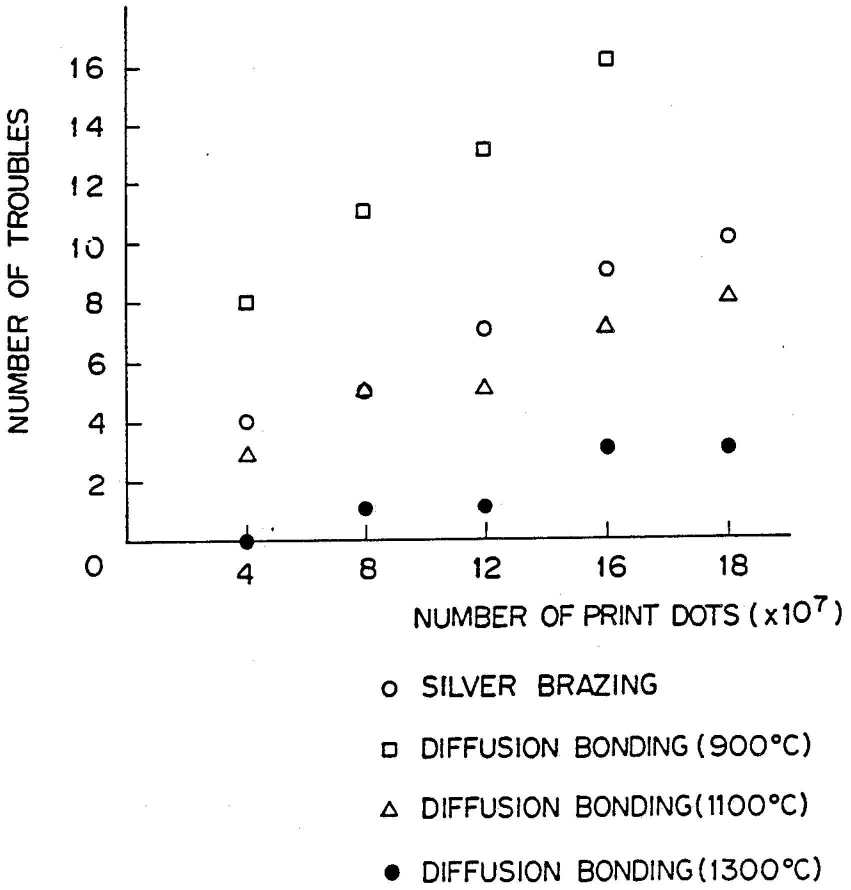
FIG. 4 is a diagram showing the strength of the bonded part obtained as a result of experiments.

The occurrence of troubles, such as breakage and separation of the bonded part between the lever 18 and the armature 19, that is the strength of the bonded part are shown in FIG. 3 and FIG. 4.

FIG. 3 shows the case of the combination (1) above, while FIG. 4 shows the case of the combination (2) above. In these figures, the horizontal axis represents the number of print dots from the start of the printing. The vertical axis represents the accumulated number of occurrences of the troubles in the bonded part.

In the figures, ○ is for the case of the movable part with the silver brazing, while □, Δ and ● are for the cases of the movable part with heat diffusion, for the temperatures of the diffusion being 900° C., 1100° C. and 1300° C., respectively.

The above temperatures were used considering the temperatures which the vacuum reactor can maintain operation stably.

It will be clear from these figures that with the above combination (1) the movable parts heat-treated at a temperature of 900° C. have greater number of occurrences of troubles than those with silver brazing, while those heat-treated at temperatures of 1100° C. and 1300° C. have a smaller number of occurrences of troubles than those with silver brazing. Similar results were obtained for the above combination (2).

The time for the heat-treatment was about 5 hours in either of the cases (1) and (2). The bond strength is well considered to vary with the heat-treatment time, but the experiments conducted this time revealed that heat-treatment at 1100° C. for about 5 hours will result in movable parts with a sufficiently greater bond strength than those obtained by silver brazing.

In the embodiment described, the pressure which the bonding part 20 receives from the bonding groove 21 is 0.3 to 0.5 $kgf/cm^2$. But this pressure can be more than 0.5 $kgf/cm^2$.

In the embodiment described, the degree of the vacuum used is $1\times10^{-4}$ Torr. But the degree of vacuum can be lowered to $1\times10^{-3}$ Torr.

As has been described, according to the invention, the base part of the lever is fitted in the bond groove at the tip of the armature, and they are diffusion-bonded. Accordingly, degradation of the lever material due to oxidation of the bonded part due to flux can be eliminated. As a result, breakage and separation of the bonded part between the lever and the armature can be prevented, and a movable part of the wire-dot print head which has a sufficient bond strength and which is highly reliable can be obtained.

Moreover, in the prior art method, titanium alloys were not used because silver brazing is difficult with titanium alloys, but as in this invention the lever and the armature are bonded by heat diffusion, titanium alloys can be used as materials for the lever and the armature. It is therefore possible to obtain a movable part which makes use of the toughness and corrosion resistance of titanium.

What is claimed is:

1. A method of producing a movable part of a wire-dot print head comprising an armature supported by a plate spring, and a lever having a tip to which print wire is fixed, said method comprising the steps of:
   - forming the armature and the lever;
   - inserting a bond part of a base part of the lever in a bond groove provided in a tip of the armature; and
   - heat-treating the lever and the armature in vacuum, so that the lever and the armature are diffusion-bonded;
   - wherein said armature and said lever are formed of materials easy to diffuse into each other at the temperature of the heat treatment for the diffusion.

2. A method according to claim 1, wherein said armature and said lever are formed of materials having diffusion coefficients of not less than about $1\times10^{-14}$ $m^2/sec.$ at the temperature of the heat treatment for the diffusion.

3. A method according to claim 1, wherein said armature and said lever are formed of materials containing identical atoms.

4. A method according to claim 1, wherein said armature and said lever are formed of alloys containing identical metal atoms.

5. A method according to claim 1, wherein the temperature of the heat treatment for the diffusion is not lower than about 1100° C. and below the melting points of the materials of said lever and said armature.

6. A method according to claim 1, wherein said bond part is pressure-inserted in said bond groove so that the bond part receives the pressure of about 0.3 to 0.5 $kgf/cm^2$ from the bond groove.

7. A method according to claim 1, wherein said bond part is plate-shaped, and said bond groove is a slit having a width corresponding to the thickness of the plate-shaped bond part.

8. A method according to claim 1, wherein said armature is formed of silicon steel and said lever is formed of SK steel.

9. A method according to claim 1, wherein said armature is formed of high-density magnetic flux material containing cobalt such as Permendur, and said lever is formed of maraging steel, titanium alloy or Elgiloy.

* * * * *